Patented Sept. 2, 1924.

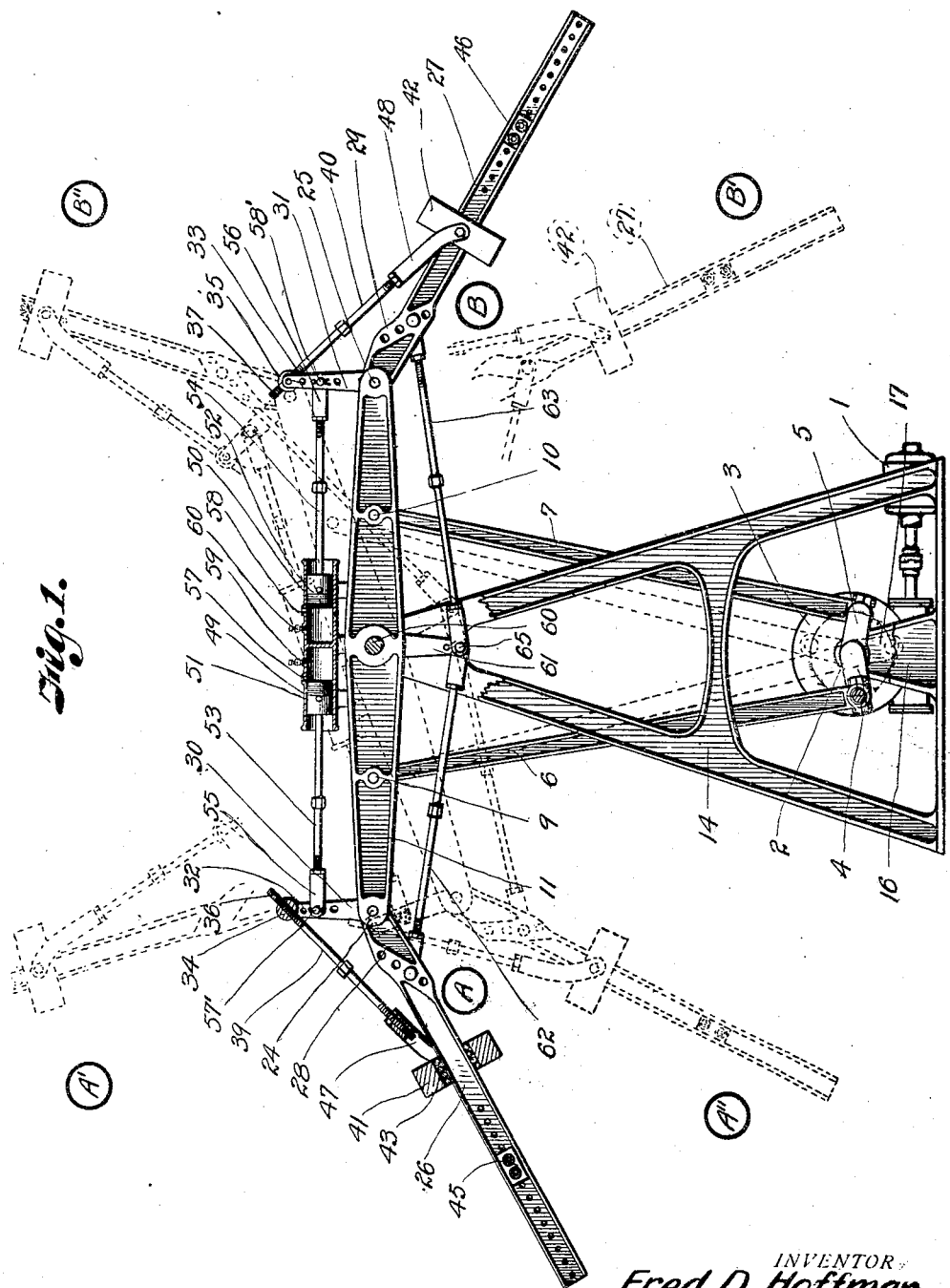

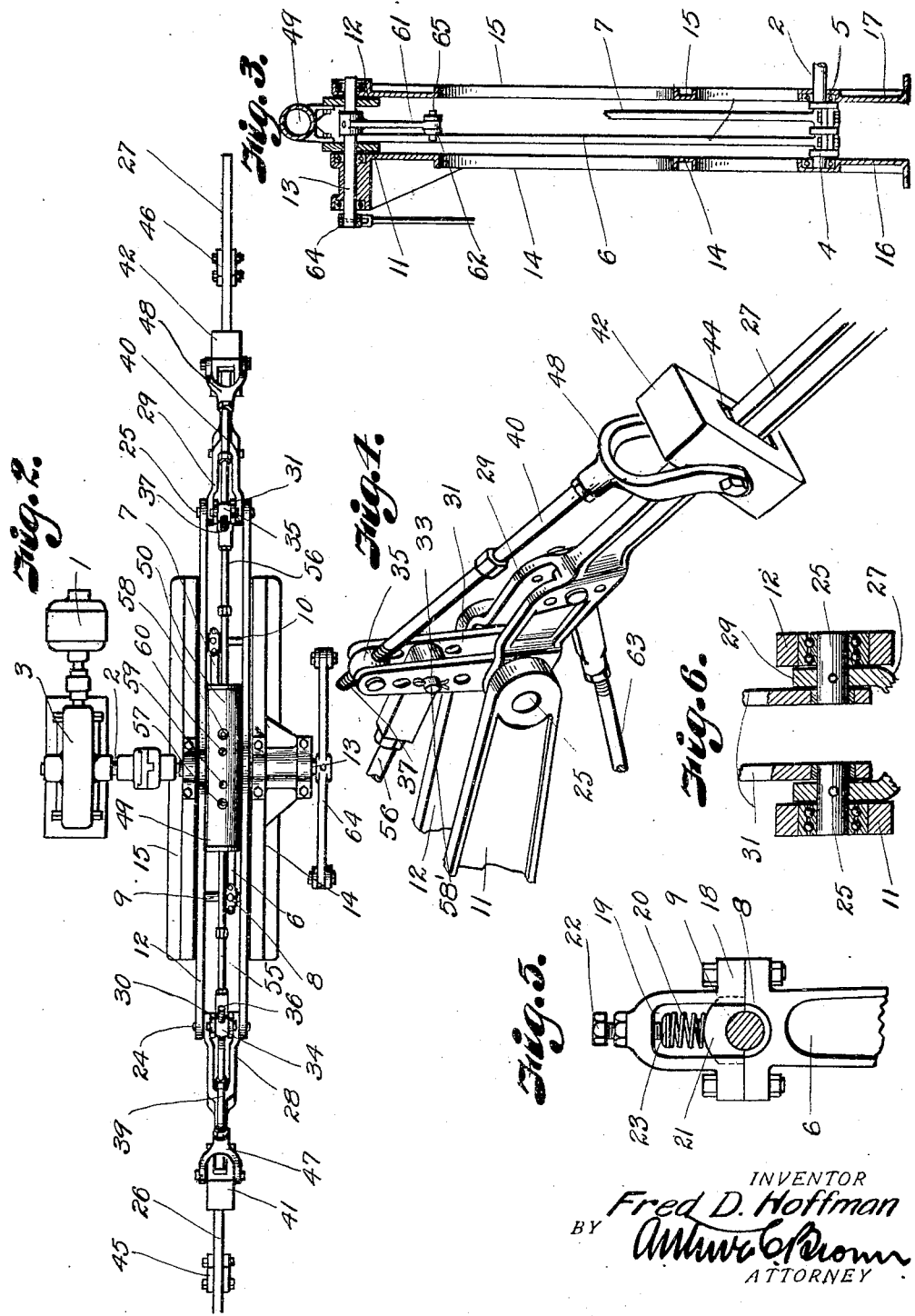

1,507,061

UNITED STATES PATENT OFFICE.

FRED D. HOFFMAN, OF KANSAS CITY, MISSOURI.

POWER TRANSMISSION.

Application filed October 8, 1923. Serial No. 667,262.

*To all whom it may concern:*

Be it known that I, FRED D. HOFFMAN, a citizen of the United States, residing at Kansas City, in the county of Jackson and State of Missouri, have invented certain new and useful Improvements in Power Transmissions; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to power transmission and the primary object of the invention is to provide a power transmission which will so neutralize the transmission losses between the driving element and the driven element that such losses will be practically nil.

Most motors operate efficiently only at high speeds and many mechanisms must be driven at low speed so it becomes necessary to provide a reduction transmission between the driving element and the driven element with a result that there is considerable loss of power, due to friction, back lash, etc., in the transmission.

My invention contemplates the provision of a transmission means wherein the losses will be reduced to a minimum. By way of example the motor may consist of an electric motor, an internal explosion motor or a steam turbine, any one of which will operate most efficiently at high speeds and the driven element may consist of a pump or similar device operating at low speed. With the ordinary power transmission the transmission losses would be considerable, but with my invention the losses would be negligible due to the fact that the driving mechanism and the driven mechanism are better balanced and the elements of the power transmission are so equi-poised that it develops a very high transmission efficiency.

The invention also contemplates a construction in which pendulum levers are carried by a tilting lever or walking beam, with weights on the pendulum levers which have progressively accelerated movements on the arms toward the free ends of the levers until they strike against stops to permit the levers to take the full force of the blow or momentum of the weights in such a manner that the blow and consequently the power generated by the accelerated speed of the weights will be communicated to the power delivery element of the transmission. Some of the power is absorbed by a power storage device which will later give up its power to return the pendulum lever to its reverse position preparatory to again accumulate power for the delivery element.

The novel construction of the invention as well as the generic principles involved will be clearly apparent by reference to the following description in connection with the accompanying drawings, in which—

Fig. 1 is an elevational view of a power transmission constructed in accordance with my invention.

Fig. 2 is a plan view of the same.

Fig. 3 is a vertical center cross sectional view.

Fig. 4 is an enlarged detailed perspective view of one end of a walking beam and an over-balance weight associated therewith.

Fig. 5 is an enlarged view of one end of one of the connecting rods between the walking beam and the crank shaft of the driving element, and Fig. 6 is a cross sectional view through one end of the walking beam.

1 designates a prime mover illustrated as an electric motor of standard construction, although the prime mover may consist of any appropriate type of motor. The prime mover drives a crank shaft 2 through a suitable transmission in the casing 3. The form of transmission is unimportant and any suitable means may be used for transmitting the power from the prime mover 1 to the crank shaft 2. The crank shaft 2 is illustrated as provided with two cranks 4 and 5 connected to connecting rods 6 and 7. The connecting rods are each provided at their upper ends with bearings 8 (see Fig. 5) in which are received the cross rods 9 and 10 carried by the walking beam consisting of the two spaced parallel members 11 and 12 rigidly fastened together but loosely mounted upon the transverse shaft 13 carried by the two triangular members 14 and 15 of the supporting frame; the bases of the supporting frames being also provided with webs 16 and 17 in which the crank shaft 2 is mounted. Two connecting rods are shown for applying power to the walking beam and only the up strokes of such rods are used in applying power to the shafts 9 and 10 of the walking beam. The upward stroke of both rods occur on the same side of center. There are points where the other or downward moving connecting rod tends to stretch due to the difference in length of the hypotenuse of the angles produced on opposite sides of the crank center as in relation to the walking beam and therefore in order to obviate the possibility of a binding action occuring I provide flexible bearings 8 which are provided with bearing caps 18 having elongated slots 19 in which are compression springs 20 bearing on the slidable blocks 21 which in turn bear on the rods or shafts 9 and 10. The compression of each spring may be varied by a compression screw 22 which extends through a bearing cap and which has a head 23 to bear against a spring.

Another important feature in connection with my invention is the fact that the actual power applied stroke does not utilize power from the prime mover after the crank has moved past bottom dead center until the power stored up by compressing the spring 20 has been recovered and then the required power is only utilized as a sort of a booster while the crank travels through but a few degrees in causing the then lowest end of the walking beam to move upward and start the weights 41 and 42 to swing out producing centrifugal force thus permitting the upward and outward moving weight to carry the load after being boosted by the connecting rod, much on the same order as giving a person in an ordinary swing a slight shove at each stroke causing them to swing higher and higher, therefore a fly wheel action is maintained with but a very little power being imparted to the walking beam resulting in unusually high efficiency. Loosely pivoted on the shafts 24 and 25 at the respective ends of the walking beam are two vibratory throw levers 26 and 27. These throw levers are in the form of arms having their ends 28 and 29 bifurcated to receive between them independently movable paired upstanding arms 30 and 31 provided with holes or perforations 32 and 33 to receive the trunnions 34 and 35. The threaded ends 36 and 37 of the weight actuating rods 39 and 40 project through the trunnions and the weight clevises, the threaded ends permitting adjustment of said rods to provide the necessary balance or movement of the weights 41 and 42 which slide on the arms or levers 26 and 27. The weights are provided with central openings 43 and 44 through which the arms or levers 26 and 27 project and the weights are preferably provided with anti-friction bearings so that they will slide on the levers or arms with a minimum amount of friction. The levers or arms 26 and 27 are provided with adjustable buffers or stops 45 and 46 for the weights 41 and 42. The rods 39 and 40 are shown as having bifurcated or yoke-shaped ends 47 and 48 which are pivoted to the weights 41 and 42. Carried by the walking beam consisting of the two members 11 and 12 are two cylinders 49 and 50 in which reciprocate pistons 51 and 52 connected to the arms 30 and 31 by piston rods 53 and 54, the piston rods being fastened to the upstanding arms 30 and 31 above the bifurcated ends 55 and 56, the connections being accomplished by the pins 57' and 58'. The cylinders and pistons constitute checks and impulse means. The cylinders may be provided with ports 57 and 58 in the compression chambers so that the pistons may move on a compression stroke to initially expel air from the compression chambers but when the pistons lap the ports 57 and 58 air will be compressed and thus form a power accumulator to the upper movement of the weights 43 and 44 whereupon the air so compressed will, when the shock has been fully absorbed and no further inward strain is exerted upon the piston it will give up its power by forcing the piston out, hence aiding the action of gravity in starting the throw levers 26 and 27 in their downward course. Each cylinder is also provided with a valved port, the ports being indicated at 59 and 60 and the effective port areas are controlled by suitable valves so if desired a slight leakage of the compression from the cylinders may be provided for in order to balance the compression with respect to the throw of the levers or arms 26 and 27. The shaft 13 has a depending arm 61 rigidly connected thereto and to which two tie rods 62 and 63 are so mounted as to turn about a pin 65 the other ends of such rods being connected to the bifurcated ends 28 and 29 of the throw levers 26 and 27. Fixed to the outer end of the shaft 13 is a cross bar 64, to the respective ends of which may be connected the devices or elements to be driven. Attention is called to the fact that there is but one place on the machine where it is possible to tie the weighted levers together, and that is by the tie rods 62 and 63 through the pin 65; in other words the weighted levers have no direct connection with the movement of the walking beam only through the disturbing of the inertia at the ends of the walking beam until they synchronize. It will be observed that the walking beam is shown as consisting of two spaced parallel bars rigidly connected, this construction being preferred over a single walking beam, because a space is provided for the connecting rods 62 and 63 and further permits the weighted throw levers together with their accessories to be so carried and arranged as to permit unobstructed movement of the working parts when the walking beam swings about the shaft 13.

Assuming the parts to be assembled and the motor 1 operating, a rocking movement of the walking beam is produced by the revolving of the crank shaft 2 and the reciprocating of the connecting rods 6 and 7 thus imparting a swinging movement to the levers 26 and 27 which carry the weights 41 and 42 and as the end A of the walking beam is raised the end B is lowered and as the end A starts to rise, the weight 41, being near the pivotal center of the lever 26 will lift due to the fact that the lever 27 is descending and carrying with it the weight 42 of the same value as the weight 41, but at a point further removed from the pivotal center of the lever 27 than is the weight 41 on the lever 26 and, therefore giving it an advantage over the lever 26 this being true due to the fact that the two levers 26 and 27 are pivotally connected through the tie rods 62 and 63 which rods also fasten to the depending arm 61 of the shaft 13 to which it is rigidly attached. By means of this arrangement, when the walking beam is set into motion as above described a swinging movement is imparted to the weighted levers 26 and 27 and in that the weight on the lever 27 is a greater distance from the pivotal center than is the weight 41, an overbalance is produced which tends to raise the lever 26, the lever at the same time receiving a boost from the thrust of the connecting rod 6, therefore as the weighted lever swings, momentum accumulates and causes the free end of the lever 26 to continue in its upward path after the end A of the walking beam starts downward resulting in the weight 41 moving through a greater number of degrees than the end of the walking beam and causing the lowering of one weight to raise the other, for example, if the weight 41 weighs 50 pounds and is at a point one foot from the pivotal center of the weighted lever and a like weight 42 is two feet from the pivotal center of the other weighted lever, then the last mentioned weight will have a force of twice or one hundred foot pounds to overcome the fifty foot pounds.

From this explanation it is obvious that the travel of the free end on the levers becomes greater and greater with each stroke of the walking beam until the travel becomes so great that the weights hit against the bumper blocks 45 and 46 alternately, preventing them from sliding off the end of the levers due to their tendency to travel at a tangent to their circular motion, whereupon a compression action will be set up in rod 39, when the end A of the walking beam is in its up position, which acts on arm 32 causing its movement about shaft 24 to which the piston rod 53 and piston 51 is connected and thus imparts an inward movement to the piston 51 whereupon the air in cylinder 49 will be compressed.

In accomplishing the above the weight 41 will have moved outward to the dotted line position A′, the lever 27 to the dotted line position B′ with the weight 42 nearer the axis of its pivot so that when the connecting rod 7 begins to push on the B side of the walking beam the overbalancing weight 41 will overcome the weight 42 and augmented by the compression in cylinder 49 the piston 51 will exert an impulse on the weight 41 to cause it to start on its downward course along with lever 26 and since the weighted leverage of lever 26 is greater than the leverage of the lever 27 the B side of the walking beam will be raised until the weighted lever 27 will assume the dotted line position of B″ (Fig. 1) and the weighted lever 26 will assume the dotted line position of A″ (Fig. 1) then a cycle of operations will be repeated, it being clearly apparent that as the walking beam oscillates about the axis of the shaft 13 the weighted levers alternately overbalance one another causing a swinging movement to be imparted to the arm 61 to rock the shaft 13 that the cross bar 64 may be rocked through a considerably greater arc than that through which the walking beam moves, thus delivering power to the mechanism to be driven in an unusually high efficient manner.

The fact that the cross bar 64 moves through a considerably greater arc than does the walking beam is one of the novel features of my invention because the fulcrums of the rods 62 and 63 shift as in respect to the center shaft 13 and this is especially true when the outer ends of the weighted levers pass above the center line of the walking beam; in other words the swinging of the weighted levers produce a toggle action and move the cross bar through a greater arc than that through which the walking beam travels.

Each time a connecting rod 6 or 7 exerts a pushing action on a shaft 9 or 10 the opposite connecting rod is moving downward against a slight action of the spring 20 so that a lost motion connection on the recovery stroke of the connecting rod is provided so as not to oppose the pushing action of the connecting rod doing useful work so it will seem that the connecting rods 6 and 7 merely alternately function and recover during the operation of the transmission.

Therefore by the overbalancing operations of the respective levers together with the shifting of fulcrums as in respect to the center shaft 13, the mechanisms of the prime mover or driving member and the mechanisms of the driven member are drawn to a state of equal poise to cut down the resistance of transmission losses in delivering power from the prime mover to the driven element and in addition thereto causes the power delivery member 64 to move through a greater arc than the walking beam, so that the power delivered to the driven element is very little less than the power generated by the prime mover. Therefore the transmission losses are reduced to a minimum, thereby enabling me to operate a machine or mechanism with the prime mover of less capacity than would be possible by transmitting the power through standard transmission mechanisms.

While I have described my invention in one form I do not desire to be restricted to the precise construction or arrangement of parts as herein described, as it is obvious that a variation in the form or arrangement of parts can be made without materially changing the principles involved.

What I claim and desire to secure by Letters Patent is:

1. In a power transmission, a frame, a walking beam on the frame, means for actuating the walking beam, pendulum arms carried by the respective ends of the walking beam, weights on the pendulum arms and means for sliding the weights in alternate directions.

2. In a power transmission, a walking beam, means for actuating the walking beam, pendulum arms carried by the respective ends of the walking beam, weights on the pendulum arms, means for sliding the weights in alternate directions, a power delivery element and means connecting the pendulum arms to the power delivery element.

3. In a power transmission, a walking beam, means for actuating the walking beam, pendulum arms carried by the respective ends of the walking beam, weights on the pendulum arms, means for sliding the weights in alternate directions, a power delivery element and means connecting the pendulum arms to the power delivery element, said means comprising tie-rods.

4. In a power transmission, a walking beam, means for actuating the walking beam, pendulum arms carried by the respective ends of the walking beam, weights on the pendulum arms, means for causing relatively sliding movement between the pendulum arms and weights and means for actuating the second mentioned means so that the weights on the pendulum arms will slide in opposite directions.

5. In a power transmission, a walking beam, means for actuating the walking beam, pendulum arms connected by the respective arms of the walking beam, weights on the pendulum arms, means for causing relatively sliding movement between the pendulum arms and weights and means for actuating the second mentioned means so that the weights of the pendulum arms will slide in alternately opposite directions, said means comprising cylinders and pistons connected to the second mentioned means.

6. In a power transmission a walking beam, means for actuating a walking beam, pendulum arms carried by the respective arms of the walking beam, weights on the pendulum arms, independently movable means for causing relatively sliding movement between the pendulum arms and the weights, means for actuating the second mentioned means so that the weights on the pendulum arms will slide in alternately opposite directions, said means comprising the cylinders carried by the walking beam and pistons in the cylinders connected to the second mentioned means.

7. In a power transmission, a walking beam, means for actuating the walking beam comprising a pair of connecting rods, each having functional movement with the walking beam in one direction only, one connecting rod having lost motion movement when its complementary connecting rod is functioning, pendulum arms on the ends of the walking beam, sliding weights on the pendulum arms, means for causing the weights on the pendulum arms to alternately slide in opposite directions and impulse members for imparting movement to said weights.

8. In a power transmission, a walking beam, means for actuating the walking beam, pendulum arms carried by the respective arms of the walking beam, weights on the pendulum arms, means for causing the weights to alternately slide in opposite directions on the pendulum arms and boosters for the pendulum arms having alternating actions.

9. In a power transmission, a walking beam, means for actuating the walking beam, pendulum arms carried by the respective arms of the walking beam, weights on the pendulum arms, means for causing the weights to alternately slide in opposite directions on the pendulum arms and boosters for the pendulum arms having alternating actions, said boosters comprising pistons and cylinders storing up energy on the up-strokes of their arms and having boosting actions on the initial down strokes of the arms.

10. In a power transmission, a walking beam, pendulum arms carried by the respective arms of the walking beam, buffers on the pendulum arms, sliding weights movable toward and away from the buffers in alternating relation and means for effecting sliding movement of said weights.

11. In a power transmission, a walking beam, pendulum arms carried by the respective arms of the walking beam, buffers on the pendulum arms, sliding weights movable toward and away from the buffers in alternating relation and means for effecting sliding movement of said weights, boosting devices and connections between the weights and the boosting devices.

12. In a power transmission, a frame, a walking beam on the frame comprising two parallel members working in unison, pendulum arms pivoted between the parallel members, upstanding arms pivoted between the parallel members, a swinging depending arm, connecting rods between the pendulum arms and the depending arm, sliding weights on the pendulum arms, rods connecting the sliding weights to the upstanding arms, oppositely disposed cylinders carried by the walking beam, pistons in the cylinders, rods connecting the pistons to the upstanding arms and means for actuating the walking beam.

13. In a power transmission, a frame, a walking beam on the frame comprising two parallel members working in unison, a supporting shaft for the walking beam, pendulum arms pivoted between the parallel members, upstanding arms pivoted between the parallel members, a swinging depending arm, rigidly attached to the shaft, a power delivery member for the shaft, connecting rods between the pendulum arms and the depending arm, sliding weights on the pendulum arms, rods connecting the sliding weights to the upstanding arms, oppositely disposed cylinders carried by the walking beam, pistons in the cylinders, rods connecting the pistons to the upstanding arms and means for actuating the walking beam.

14. In a power transmission, a walking beam, means for actuating the walking beam, pendulum arms on the walking beam, weights on the pendulum arms, means for causing the weights to swing in arcs generated on alternating short and long radii.

15. In a power transmission, a walking beam, means for actuating the walking beam, pendulum arms on the walking beam, weights on the pendulum arms, means for causing the weights to swing in arcs generated on alternating short and long radii, and means for boosting the weights.

16. In a power transmission comprising a frame, a walking beam on the frame, means for actuating the walking beam, levers adapted to swing from the walking beam, rods pivotally mounted between and tying the levers together, weights slidably mounted on the levers and means for forcing the weights to slide in alternate relation to one another in respect to their position on such levers when the levers are actuating.

17. In a power transmission, comprising a frame, a walking beam on the frame, means for actuating the walking beam comprising a pair of connecting rods, each having functional movement with the walking beam in one direction only, means for actuating the connecting rods comprising a crank shaft having two arms so arranged as to cause the respective connecting rods to apply the same length of power stroke to each arm of the walking beam, means on each connecting rod for permitting lost movement on the down stroke when its complementary connecting rod is functioning, levers adapted to swing from the walking beam, rods pivotally mounted between and tying the levers together, weights slidably mounted on the levers and means for forcing the weights to slide in alternate relation to one another in respect to their position on such levers when the levers are actuating.

In testimony whereof I affix my signature.

FRED D. HOFFMAN.